US010569227B2

(12) United States Patent
Menozzi et al.

(10) Patent No.: US 10,569,227 B2
(45) Date of Patent: Feb. 25, 2020

(54) IMPROVING THE CHEMICAL STABILITY OF FILTRATION MEMBRANES

(71) Applicant: BASF SE, Ludwigshafen (DE)

(72) Inventors: Edoardo Menozzi, Wettingen (CH); Martin Heijnen, Landsberg am Lech (DE); Martin Weber, Maikammer (DE); Nicole Janssen, Gau-Odernheim (DE)

(73) Assignee: BASF SE, Ludwigshafen (DE)

( * ) Notice: Subject to any disclaimer, the term of this patent is extended or adjusted under 35 U.S.C. 154(b) by 154 days.

(21) Appl. No.: 15/029,568

(22) PCT Filed: Oct. 13, 2014

(86) PCT No.: PCT/IB2014/065254
§ 371 (c)(1),
(2) Date: Apr. 14, 2016

(87) PCT Pub. No.: WO2015/056145
PCT Pub. Date: Apr. 23, 2015

(65) Prior Publication Data
US 2016/0263529 A1    Sep. 15, 2016

(30) Foreign Application Priority Data

Oct. 15, 2013 (EP) ..................................... 13188687

(51) Int. Cl.
*B01D 65/02* (2006.01)
*B01D 69/02* (2006.01)
*B01D 71/68* (2006.01)
*C02F 1/44* (2006.01)
*B29K 81/00* (2006.01)
*B29L 31/00* (2006.01)
*B29C 48/00* (2019.01)
*B29C 48/88* (2019.01)
*B01D 61/58* (2006.01)
*B01D 67/00* (2006.01)
*B01D 69/04* (2006.01)
*B01D 69/08* (2006.01)

(52) U.S. Cl.
CPC .......... *B01D 65/022* (2013.01); *B01D 61/58* (2013.01); *B01D 67/002* (2013.01); *B01D 69/02* (2013.01); *B01D 69/04* (2013.01); *B01D 69/087* (2013.01); *B01D 71/68* (2013.01); *B29C 48/0012* (2019.02); *B29C 48/022* (2019.02); *B29C 48/919* (2019.02); *C02F 1/44* (2013.01); *B01D 2321/04* (2013.01); *B01D 2321/168* (2013.01); *B01D 2325/28* (2013.01); *B29K 2081/06* (2013.01); *B29K 2995/0068* (2013.01); *B29L 2031/755* (2013.01); *C02F 2305/02* (2013.01)

(58) Field of Classification Search
None
See application file for complete search history.

(56) References Cited

U.S. PATENT DOCUMENTS

| | | | |
|---|---|---|---|
| 5,480,554 A | * | 1/1996 | Degen .................. B01D 65/102 210/500.41 |
| 6,284,137 B1 | | 9/2001 | Hajikano et al. |
| 6,787,216 B1 | | 9/2004 | Koenhen |
| 6,884,350 B2 | | 4/2005 | Muller |
| 7,300,022 B2 | | 11/2007 | Muller |
| 7,404,896 B2 | | 7/2008 | Muller |
| 8,147,735 B2 | | 4/2012 | Buschmann |
| 8,684,187 B2 | | 4/2014 | Buschmann |
| 8,999,602 B2 | | 4/2015 | Oliver |
| 9,120,062 B2 | | 9/2015 | Martin |
| 9,127,160 B2 | | 9/2015 | Martin |
| 9,199,205 B2 | | 12/2015 | Martin |

(Continued)

FOREIGN PATENT DOCUMENTS

CN        85107881 A       5/1987
EP       0 764 461 A1      3/1997
(Continued)

OTHER PUBLICATIONS

JP200140585 Machine Translation—Minegishi, Shinichi et al (Year: 2000).*
Radel Design Guide—Solvay Advanced Polymers (Year: 2004).*
"Novel polyphenylsulfone membrane for potential use in solvent nanofiltration"—Darvishmanesh, Siavash et al—Journal of Membrane Science 379 (2011) 60-68—May 27, 2011 (Year: 2011).*
"Preparation of solvent stable polyphenylsulfone hollow fiber nanofiltration membranes"—Darvishmanesh, Siavash et al—Journal of Membrane Science 384 (2011) 89-96—Sep. 12, 2011 (Year: 2011).*
Partial Supplementary European Search Report dated Jun. 9, 2017 in Patent Application No. 14854746.6.
Radel Design Guide, Radel A Polyethersulfone, Radel R Polyphenylsulfone, ACUDEL Polyphenylsulfone Blends, Solvay Advanced Polymers, XP055103064, Feb. 29, 2004, 63 pages.

(Continued)

*Primary Examiner* — Bradley R Spies
(74) *Attorney, Agent, or Firm* — Oblon, McClelland, Maier & Neustadt, L.L.P.

(57) ABSTRACT

Polyethers (A), whose main chain essentially consists of repeating units of the formulae (1) and (2) in alternating order, are useful as an additive to a porous polymer membrane, or as the main polymer constituent of a porous polymer membrane, for stabilizing said membrane against detrimental effects of oxidizing agents and/or for improving the stability of a filtration module comprising said membrane against detrimental effects of oxidizing agents.

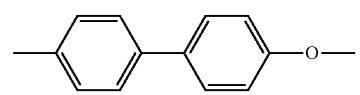

(1)

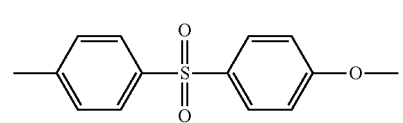

(2)

9 Claims, No Drawings

(56) References Cited

U.S. PATENT DOCUMENTS

| | | |
|---|---|---|
| 2004/0035782 A1 | 2/2004 | Muller |
| 2005/0029185 A1 | 2/2005 | Muller |
| 2005/0029186 A1 | 2/2005 | Muller |
| 2005/0032982 A1 | 2/2005 | Muller |
| 2005/0161389 A1* | 7/2005 | Takeda ............ B01D 63/02 210/321.75 |
| 2005/0184008 A1* | 8/2005 | Schacht ............ B01D 65/00 210/636 |
| 2009/0124767 A1 | 5/2009 | El-Hibri |
| 2010/0006495 A1 | 1/2010 | Buschmann |
| 2010/0095876 A1* | 4/2010 | Looney ............ B82Y 30/00 110/203 |
| 2010/0230351 A1* | 9/2010 | Hoving ............ B01D 69/02 210/650 |
| 2012/0255898 A1 | 10/2012 | Buschmann |
| 2013/0189550 A1 | 7/2013 | Janssen et al. |
| 2013/0341273 A1 | 12/2013 | Weber et al. |
| 2014/0272565 A1 | 9/2014 | Gronwald et al. |
| 2016/0002411 A1 | 1/2016 | Menozzi et al. |
| 2016/0075833 A1 | 3/2016 | Weber et al. |
| 2016/0075850 A1 | 3/2016 | Weber et al. |
| 2016/0108178 A1 | 4/2016 | Weber et al. |
| 2016/0114296 A1 | 4/2016 | Weber et al. |
| 2016/0152776 A1 | 6/2016 | Weber et al. |
| 2016/0158707 A1 | 6/2016 | Heijnen et al. |

FOREIGN PATENT DOCUMENTS

| | | |
|---|---|---|
| EP | 0 764 461 B1 | 8/2002 |
| EP | 1 524 297 A1 | 4/2005 |
| EP | 2 272 915 A2 | 1/2011 |
| JP | 10-272343 A | 10/1998 |
| JP | 11-542 A | 1/1999 |
| JP | 2000-140585 A | 5/2000 |
| JP | 2008-29906 A | 2/2008 |
| WO | 02/42530 A1 | 5/2002 |
| WO | 2006/037755 A1 | 4/2006 |
| WO | 2011/023584 A2 | 3/2011 |
| WO | 2011/110441 A2 | 9/2011 |
| WO | 2013/114297 | 8/2013 |
| WO | 2013/114300 A1 | 8/2013 |
| WO | 2014/170391 A1 | 10/2014 |

OTHER PUBLICATIONS

BASF, "Ultrason E, S, P (PESU, PSU, PPSU) Product Brochure", XP002720562, Oct. 31, 2010, 52 pages.

BASF, "Ultrason Resistance to chemicals", XP055103078, Jul. 31, 2013, 23 pages.

Emmanuelle Gaudichet-Maurin, et al., "Ageing of polysulfone ultrafiltration membranes in contact with bleach solutions", Journal of Membrane Science, XP055078591, vol. 282, No. 1-2, Oct. 5, 2006, pp. 198-204.

Extended European Search Report dated Sep. 19, 2017 in Patent Application No. 14854746.6.

International Search Report and Written Opinion of the International Searching Authority dated Feb. 17, 2015, in PCT/IB2014/065254 Filed Oct. 13, 2014.

U.S. Appl. No. 14/917,488, filed Mar. 8, 2016, Martin Weber, et al.

C. Regula, et al., "Ageing of Ultrafiltration Membranes in Contact with Sodium Hypochlorite and Commercial Oxidant: Experimental Designs as a New Ageing Protocol" Separation and Purification Technology, Elsevier, vol. 103, 2013, pp. 119-138.

R. Viswanathant, et al., "Synthesis, Kinetic Observations And Characteristics of Polyarylene Ether Sulphones Prepared Via a Potassium Carbonate DMAC Process" Polymer, vol. 25, Dec. 1984, pp. 1827-1836.

J.L. Hedrick, et al., "Radiation Resistant Amorphous—All Aromatic Polyarylene Ether Sulfones: Synthesis, Characterization, and Mechanical Properties" Journal of Polymer Science: Polymer Chemistry Edition, vol. 23, 1986, pp. 287-300.

* cited by examiner

IMPROVING THE CHEMICAL STABILITY OF FILTRATION MEMBRANES

The invention relates to the use of a polyphenylsulfone type polyether (PPSU) for improving a membrane's chemical resistance, especially the one of water filtration membranes as used e.g. for micro- or ultrafiltration, nanofiltration or reverse osmosis. The invention further relates to a filtration process which includes chemical cleanings, which process uses a filtration membrane comprising aforesaid polymer.

The most common polymeric membranes for water filtration are based on cellulose acetate, polysulfone (PSU), polyethersulfone (PESU), and poly(vinyldifluoride) (PVDF), and cross linked (semi)aromatic polyamide materials.

Polyphenylsulfone (PPSU) is a polyether, whose main chain mainly consists (typically in alternating order) of repeating units of formulae (1) and (2):

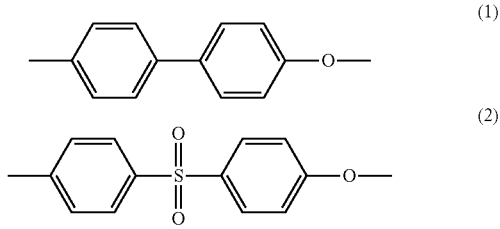

PPSU has already been used for the preparation of filtration membranes:

EP-A-2272915 describes polyethers comprising certain disulfone moieties as recurring units, which polyethers may further comprise recurring units of the formulae (1) and (2), or polymer compositions comprising a further polymer such as PPSU as a minor component; the document recommends these polymers or polymer compositions for the preparation of membranes for purification of liquids or gas separation.

EP-B-0764461, and literature cited therein, describe porous filtration membranes consisting of mixtures of PESU (i.e. the homopolymer of repeating units of formula (2)) and PPSU, reporting good flux properties and heat resistance, while membranes comprising PPSU alone are found to show insufficient permeability.

For the regular cleaning of filter units, membranes are often contacted with oxidizing solutions; such steps are also recalled as chemical backwash, disinfection or bleaching. Such solutions commonly used as cleaner and disinfectant for filtration membranes in water applications (containing, for example, $H_2O_2$, ozone, peracetic acid, $ClO_2$, $KMnO_4$, $Cl_2$ gas dissolved in water) can cause changes in membrane properties. As a result, either the functional properties of the membranes gradually change, so the production can no longer meet requirements in terms of volume or quality, or the membranes simply breaks, and the system has to be shut down for maintenance causing loss in terms of money and clean water output. Damages known in the art to be caused by oxidizing agents include a drop of the membrane's mechanical properties, fiber embrittlement, and deterioration of transport properties.

It is known that degradation, which generates an embrittlement of the membrane, occurs by polymer chain scission caused by the hydroxyl radical (OH.) formed in the bleach solution. The lifetime of the membrane exposed to elemental chlorine depends on the total chlorine concentration of the solution and also on its pH, which drives the disproportioning into hypochlorous acid and hypochlorite ions, essential condition for the formation of hydroxyl radicals (see, for example, E. Gaudichet-Maurin, F. Thominette, Journal of Membrane Science 2006, 282, pag. 198-204).

In processes run in the drinking water industry, membranes are often subjected to a cleaning regime requiring 1 minute chlorine backwash typically after 30 to 60 minutes using 10 ppm of chlorine, and 15-30 minutes of chlorine backwash once a week using 400 ppm of chlorine at pH 12 (C. Regula et al., Separation and Purification Technology 103, p. 119-138, 2013).

The problem of chemical degradation is pronounced in semipermeable membranes used for separation purposes like micro- and ultrafiltration or reverse osmosis. Membranes may be classified according to their pore dimension in most of the application profiles. For example, in water filtration applications micro- and ultrafiltration membranes are used for wastewater treatment retaining organic and bioorganic material; the inner layer of ultrafiltration membranes generally shows pore diameters below 100 nm, typically 10-50 nm, of microfiltration membranes typically 50-500 nm, while the outside layer (surface) pore diameter is typically from the range 1-2 micron. Much smaller diameters are required in desalination applications (reverse osmosis; approximate pore diameter 0.1 nm) for retaining ions. In both applications, the ambient medium is an aqueous phase, where blockage may occur by deposition of inorganic and organic pollutants, soiling, adhesion of microorganisms and bio-film formation. In consequence, membranes used in such continuous filtration processes, especially on industrial scale, have to undergo regular cleaning cycles to remove blockages. For the regular cleaning of filter units, such membranes are often contacted with acids, bases and/or oxidizing solutions as described above (chemically enhanced backwash), which impact their structure morphology. A further application is a continuous use of oxidizing agents, for example as a continuous feed chlorination such as commonly used for swimming pools or in process control.

It is essential to improve chemical stability and mechanical properties behavior of membranes. It has now been found that addition of PPSU to the membrane material improves the chemical resistance and lifetime of the membrane to a surprising extent.

The present invention thus primarily pertains to the use of a polyether (A), which essentially consists of repeating units of the formulae (1) and (2)

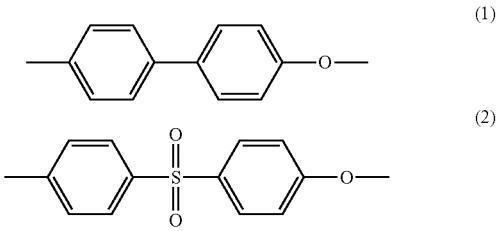

in alternating order (ratio typically about 1:1), as an additive or as the main membrane polymer, for the stabilization of a porous polymer membrane against detrimental effects of oxidizing agents, especially for the stabilization of a water filtration membrane against degradation by chemical backwash or cleaning processes.

Membranes are commonly exposed to especially harsh conditions in the case of chemical backwash processes, which are explained below in more detail. In consequence, the present invention includes a filtration process, especially for water filtration, wherein a liquid permeates a porous polymer membrane, which process is characterized in that the membrane material comprising the above polyether (i.e. PPSU), or a polyether mixture comprising PPSU as explained below, is subjected from time to time to chemically enhanced backwash;

as well as a process for the stabilization of a polymer membrane against the detrimental effects of chemical backwash, especially during chemical backwash stages of a water filtration process, which process comprises incorporation of PPSU or said mixture comprising PPSU into the membrane.

The invention further pertains to a process for the maintenance or cleaning of a filtration module or plant, especially for water filtration, containing organic polymer filtration membranes containing a polyether or polyether mixture as defined above or, in more detail, below, which process comprises contacting the membranes, especially rinsing the membranes, with an aqueous solution of an oxidizing agent. These are typically aqueous solution of oxidizing agents selected from H2O2, ozone, peracids, ClO2, KMnO4, Cl2, chlorate, perchlorate, hypochlorite.

The invention further pertains to the use of an asymmetric polymer filtration membrane as described above or in more detail below in a filtration process including chemically enhanced backwash with an oxidizing agent, especially in a water filtration process, such as microfiltration or ultrafiltration or reverse osmosis, for improving permeate flux and/or for reducing maintenance intervals.

The polyether (A) containing repeating units of the formulae (1) and (2) generally makes up at least 5% of the total weight of membrane polymers; it is typically of a molecular weight Mw from the range 10 to 500 kDa, and preferably has a polydispersity from the range 1.5 to 5.0. A preferred polyether (A) is PPSU of the formula (3)

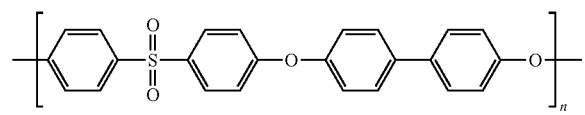

(3)

wherein n ranges from 30 to 1000.

The porous polymer membrane used according to present invention usually comprises said polyether (A), or said polyether (A) in combination with a further polyether (B), which is a polyethersulfone (PESU) essentially consisting of repeating units of the formula (2):

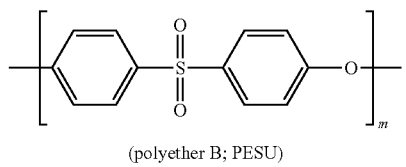

(polyether B; PESU)

wherein m typically ranges from about 40 to about 2000, in an amount of 50-100% of the total weight of membrane polymers.

Preferably, polymers forming the porous polymer membrane consist of 1 part by weight of polyether (A) (containing repeating units of the formulae (1) and (2), especially in alternating order in accordance with formula (3)), and 0 to 9 parts by weight, for example 3 to 7 parts by weight, of polyether (B) essentially consisting of repeating units of the formula (2), or essentially consists of polyether (A).

Polyethers (A) and (B) are known in the art, they are typically obtained in a polycondensation reaction. Thus, polyether (A) may be obtained by polycondensation of 4,4'-Dichlorodiphenylsulfone and 4,4'-Dihydroxybiphenyl, while polymer B is obtained by polycondensation of 4,4'-Dichlorodiphenylsulfone and 4,4'-Dihydroxydiphenylsulfone as described in Hedrick, J. L. et. al. J. Polym. Sci.: Part A Polym Chem. 1986, 24(2), 287; McGrath, J. E. et. al. Polymer 1984, 25 (12) 1827; WO 06/037755.

End groups in the present polyethers, especially polyether (A), (bonding to phenyl) typically are OH, lower alkoxy, and/or halogen (typically chloro), or (bonding to oxygen) are

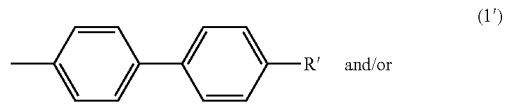

(1')

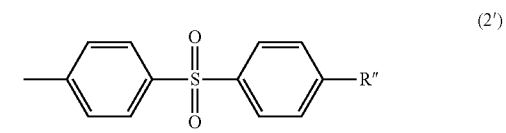

(2')

wherein R' and R" stand for OH, lower alkoxy, halogen (such as chloro).

The term "consisting essentially of" as used within the current specification denotes the main component, or especially the only component, of the membrane, where further minor organic constituents such as monomers, organic additives, minor amounts of other polymers such as PVP used in the production process are possible; it typically denotes an amount of 95-100% by weight, especially more than 98% by weight.

"Lower alkyl" as used within the current specification generally denotes alkyl of 1-10 carbon atoms, especially of 1-4 carbon atoms such as methyl. "Lower alkoxy" consequently stands for a residue —O-(lower alkyl).

In accordance with the present invention, the polymer membrane typically is a water filtration membrane, for example for microfiltration, ultrafiltration, nanofiltration, reverse osmosis.

Typically, the membrane is an asymmetric polymer membrane obtained from a polymer solution in a coating process or in a phase inversion process, and the polyether (A) has been added to the polymer solution.

A highly desired embodiment of this invention is related to a polymeric porous membrane where the ratio of polyphenylensulfone (PPSU) to polyethersulfone (PESU) is maintained in a range of PAS/PES=99/1-1/9 by weight, or preferably at 7/3-3/7 by weight and even most preferably at 1/1. Another preferred embodiment is related to a polymeric porous membrane essentially consisting of polyphenylensulfone (PPSU) and containing no polyethersulfone (PESU).

The water permeability thereof can be especially set at a high value (not less than 100 kg/m2*h*bar) and the resistance to oxidation moist can also be placed at high standard level The porous membrane made from PPSU/PESU mixture having a mixing ratio of PPSU and PESU by weight being below 1/9 is not preferable, because it has a inferior resistance to oxidation moist and its mechanical performance decreases drastically when chlorine water of not less than 10 ppm is percolated for an extended period of time.

Any component other than the main components PPSU and PESU can be used as a component for forming a membrane, as long as the various membrane characteristics of the present invention are not impaired, and, for example, alcohols such as glycerin, inorganic salts such as lithium chloride, hydrophilic organic compounds such as polyvinylpyrrolidone or polyethylene glycol, inorganic metals (such as silver, zinc or copper), inorganic oxide like silica, titanium dioxide, aluminum oxide and zinc oxide can be used. However, care must be taken in such applications of these compounds, where the dissolution of the membrane forming component into the filtrate causes problems.

Considering the above mentioned points, it is better to have a membrane composition wherein PPSU and PESU are present in a large total amount, and the total amount is preferably not less than 85% by weight.

One surface of the porous membrane of the present invention comprises a dense layer which forms a mesh-like polymer network structure having many pores with pore sizes between 0.01 and 1.0 micrometer. This dense layer controls the separation property of the porous membrane, and the separation property of the membrane of the present invention is not more than 0.5 micrometer, and is especially not more than 0.3 micrometer, preferably not more than 0.1 micrometer in order to maintain a good separation property and a high water flux. A dense layer having a membrane which is too thin is not preferable because it provides causes for the occurrence of pin-holes.

The porous membrane of the present invention has a supporting layer that supports the dense layer. In this supporting layer, a mesh-like polymer network structure is formed, wherein pores having pore sizes of 1-100 micrometer are provided while the sizes thereof increase continuously from one side, which is in touch with the separation layer, toward the other side.

By providing a dense layer and a supporting layer in such a membrane structure, a membrane with a sufficiently high mechanical strength can be obtained. The thickness of this supporting layer is preferably from 30 to 2000 micrometer, preferably from 30 to 1000 micrometer, to impart the resistance strength against pressure.

Although any known method may be employed in the manufacture of a porous separation membrane of the present invention, a method of wet forming from a polymer dope is preferably employed from the stand point of forming a porous structure having a large porosity and an asymmetric structure in the direction of a cross section of the membrane.

When such a polymer dope as described above is formed into a membrane by a wet forming method, any known method may be employed in both cases of obtaining geometries of a flat membrane and a hollow fiber membrane with single or multi-channel structure.

In the former case, the polymer dope is extruded and then casted on a flat plate, followed by forming a membrane after immersing in an external solidifying solution. And in the latter case, for example, the polymer dope and the internal solidifying solution are extruded from the sheath side and core side, respectively, of a double annular sheath/core type nozzle, followed by being introduced into the external solidifying solution after letting it pass through an air gap (dry wet spinning method) or without any air gap (wet spinning method), whereby a porous hollow fiber membrane structure is formed.

In the case of flat membrane, the evaporation performance of a solvent in the original solution is different between the surface which is in contact with the flat plate and the other surface which is in contact with the air, when they are casted on a flat plate, whereby an asymmetric membrane structure is formed when it is solidified in the external solidifying solution. In case of a hollow fiber membrane, an asymmetric membrane structure is formed by changing the ratio of "good solvent" for the polysulfone polymers, while the solvent is present in the internal and external solidifying solutions, respectively.

As for the external solidifying solution a mixed solution of a "good solvent" for the polysulfone polymers and water is used, wherein the solution contains the "good solvent" at a ratio to water of not more than 70% by weight, or preferably of 30-60% by weight. As "good solvent" compounds such as dimethylacetamide, N-methylpyrrolidone, dimethylsulfoxide, and dimethylfolmamide may be used.

Another object of this invention is also to provide a method for the manufacturing of multiple channel membranes wherein a solution of a polymer which forms a semipermeable membrane after coagulation, is extruded through an extrusion nozzle wherein several hollow needles are arranged, a gas containing coagulating vapour or a coagulating liquid is injected through the hollow needles into the extruded material during extrusion, so that parallel continuous channels extending in extrusion direction are formed in the extruded material, and the outer surface of the membrane is brought into contact with coagulation agents, characterized in that the outer surface of the membrane after it leaves the extrusion nozzle is first brought into contact with a mild coagulation agent such that the shape of the membrane is fixed without an active layer being formed on the outer surface of the membrane and subsequently the membrane is brought into contact with a strong coagulation agent. By using the method according to this invention it is possible to control the pore size on the outer surface of the membrane and those in the channels independent from each other. As a result a membrane can be obtained having a separating layer in the channels in which the outer surface with respect to the active layer has no or hardly any resistance against liquid flows in for instance micro- or ultra-filtration.

In the method according to the invention coagulation takes place from two sides, which results in the coagulation distances being reduced up to a factor two. The distance above the coagulation tank where the partly liquid membrane has to hang from itself becomes much smaller because the largest part of the coagulation takes place in the coagulation/rinse bath. In the coagulation bath the difference in specific weight between the membrane and the bath is very small in case of usual polymers and solvents.

In a preferred method according to the invention, a polymer solution, for which water is a non-solvent, is brought into contact with a vapour having a relatively high water vapour tension as mild coagulation agent, after leaving the extrusion nozzle. In this vapour path some water diffuses into the outer layer of the extruded material so that at that location superficial separation occurs and a coarser pore structure is formed. Then the membrane is submersed in water as a result of which the structure of the membrane is fixed.

According to another embodiment a mild coagulation agent is applied on the extruded material by means of an additional outlet on the circumference of the extrusion nozzle. By bringing the extruded material in contact with a mild coagulation agent both in the channels and on the outer surface, it is possible to obtain a membrane having an active layer consisting of micro-pores both in the channels and on the outer surface, in which between said active layers a layer having larger pores is situated. The invention further provides membranes obtained by using the method of the invention.

Another preferred embodiment of the membrane according to the invention is a cylindrical multiple channel membrane in which the active layer is arranged in the channels, in which the surface area of the channels is more than 1.5 times the outer surface area and the outer surface with respect to the active layer in the channels has no or hardly any resistance to flows of liquid. Such membranes and their preparation are described in U.S. Pat. No. 6,787,216, col. 2 line 57 to col. 7 line 4, which passages are hereby incorporated by reference. A cylindrical membrane having a larger diameter and a large number of channels can be mounted in a hollow fibre element considerably easier and is mechanically more stable than a number of single hollow fibre membranes having the same channel size. In a cylindrical membrane having a large number of channels the ratio between the total channel surface area and the outer surface area is large. This is no problem in the membranes according to the invention because the active layer is situated in the channels. In case there would also be an active layer on the outer surface, the resistance against liquid flows is considerable.

Since a membrane having several channels is prepared by simultaneous extrusion, a larger mechanical stability is obtained with respect to single channels having a same channel size. Said technique is mainly used in ultra-filtration and microfiltration. Coagulation agents are known to the expert. Many used coagulation agents are non-solvents for the polymer that are miscible with the solvent. The choice for the non-solvent depends on the polymer and the solvent. A solvent used much is N-methylpyrrolidone. Examples of non-solvents for use with this solvent are ethanol, propanol and water. The strength of the coagulation agent can be adjusted by the choice of the combination solvent/non-solvent and the ratio solvent/non-solvent. The coagulation can also be performed with a liquid that is not related to the solvent.

The diameter of the channels of the multiple channel membranes of the invention is between 0.1 and 8 mm and preferably between 0.1 and 6 mm. The thickness of the walls is adjusted to the pressure to be exerted in the channels depending on the intended use, such as for instance microfiltration, ultra-filtration, nano-filtration and reverse osmosis. In general the thickness of the walls is between 0.05 and 1.5 mm and preferably between 0.1 and 0.5 mm. The cylindrical membranes contain at least 3, and preferably 7 to 19 channels. The diameter of the cylindrical membrane generally is between 1 to 20 mm and preferably between 2 and 10 mm.

The present invention thus further pertains to a method for the manufacturing of a multiple channel membrane, wherein a solution of a polymer which forms a semipermeable membrane after coagulation, is extruded through an extrusion nozzle wherein several hollow needles are arranged, a gas containing coagulating vapour or a coagulating liquid is injected through the hollow needles into the extruded material during extrusion, so that parallel continuous channels extending in extrusion direction are formed in the extruded material, and the outer surface of the membrane is brought into contact with coagulation agents characterized in that polymer solution comprises a polyether or polyerther mixture as described in any of claims 1-5, and further that the outer surface of the membrane after it leaves the extrusion nozzle is first brought into contact with a mild coagulation agent, such as water vapour, such that the shape of the membrane is fixed without an active layer being formed on the outer surface of the membrane, and subsequently the membrane is brought into contact with a strong coagulation agent, as well as to a cylindrical multiple channel polymer membrane having 3 or more channels, which can be obtained by using the above method, wherein the active layer is arranged in the channels and the outer surface with respect to the active layer in the channel has no or hardly any resistance against liquid flows, characterized in that membrane polymer comprises a polyether (A) as described above; especially preferred is a spiral-wound filtration element, containing one or more membranes obtained by using the above method, that are wound around a central axis and having the channels in the direction of the axis of the winding.

Further constituents of the membrane generally may comprise (besides polyether A and optionally B) one or more further organic polymers selected from the group consisting of polyvinyl pyrrolidone, polyvinyl acetates, cellulose acetates, polyacrylonitriles, polyamides, polyolefines, polyesters, polysulfones, polyethersulfones, polycarbonates, polyether ketones, sulfonated polyether ketones, sulfonated polyaryl ethers, polyamide sulfones, polyvinylidene fluorides, polyvinylchlorides, polystyrenes and polytetrafluorethylenes, copolymers thereof, and mixtures thereof; preferably selected from the group consisting of polysulfones, polyethersulfones, polyvinylidene fluorides, polyamides, cellulose acetate, polyethylenglycols, and mixtures thereof.

Membrane Manufacturing and Processing

Polymer film membranes generally may be formed from the melt of a thermoplastic polymer, e.g. by extrusion, or from a polymer solution in a coating process or in a coagulation (phase inversion) process (such as SIPS described below). Membranes formed from the polymer melt, or by mere coating or casting of the polymer solution, usually show an isotropic (symmetrical) cross section.

Membranes formed by phase inversion usually show an asymmetric structure comprising a thin (e.g. 10-50 nm), dense separation layer and a thick porous layer, the latter e.g. providing mechanical stability and efficient transport of the filtrate. Manufacturing of ultrafiltration membranes often includes solvent induced phase separation (SIPS). The present copolymers are preferably employed as additives in this process.

In the SIPS process, the educt polymers are dissolved in a suitable solvent (e.g. N-methylpyrrolidone, dimethylacetamide or di methylsulfoxide) together with the additive(s). In a next step, a porous polymeric membrane is formed under controlled conditions in a coagulation bath. In most cases, the coagulation bath contains water as coagulant, or the coagulation bath is an aqueous medium, wherein the matrix forming polymer is not soluble. The cloud point of the polymer is defined in the ideal ternary phase diagram. In a phase separation, a microscopic porous architecture is then obtained, and water soluble components (including polymeric additives) are finally found in the aqueous phase.

It has been the finding of the present invention, that polyphenylsulfone (PPSU, polyether (A)), alone or in combination with polyethersulfone (PESU, polyether B) is suitable for obtaining membranes in accordance with the SIPS process.

Additional stability and/or antifouling properties of the present polymer compositions, especially of the membranes, may be achieved by further incorporation of one or more antimicrobial or bacteriostatic agents into the composition, such as siloxane polymer additives described in WO2011/110441 or EP patent application No. 13164510.3, or active coatings and/or hydrophilic modifications as described in International Applications PCT/IB2013/050794 and PCT/IB2013/050790. A further preferred agent is an oligodynamic metal, especially silver in ionic and/or metallic form. Optionally, the silver component may be accompanied by zinc oxide as co-component (silver composites such as disclosed in WO 11/023584). Useful silver components include silver colloids, silver glass, silver zeolites, silver salts, elemental silver in form of powder or microparticles or nanoparticles or clusters. An advantageous method of preparing an antimicrobial membrane includes in situ formation of elemental silver particles in the casting solution containing one or more (co)polymers of the present polymer composition in dissolved form. Elemental silver particles, especially those incorporated into semipermeable membranes and/or polymer matrices close to the final article's surface, may be transformed into silver halogenide particles such as AgCl, AgBr, AgI, e.g. by treatment with a hypohalogenide solution (e.g. of NaOCl).

A typical process for the preparation of membranes may comprise the following steps:
1. Dissolving the matrix polymers for a membrane's dope, such as PPSU and optionally PESU, PVP, PEG etc., in a suitable solvent, typically NMP, DMA, DMF, DMSO or mixtures of them.
2. Heating the mixtures until a viscous solution is obtained; typically temperatures are from the range 5-250° C., preferred 25-150° C., mostly preferred 50-90° C.
3. Optional admixture of additives, stirring, degassing.
4. Casting, or extruding by wet spinning, the membrane dope in a coagulation bath to obtain a membrane structure. Optionally, the casting may be outlined using a polymeric support (non-woven) for stabilizing the membrane structure mechanically.
5. Optional analysis of the membrane.

The present membrane may further comprise hydrophilicity enhancing additives, such as those disclosed in WO 02/042530.

The present membrane may further contain polysiloxane tensides such as disclosed in WO 11/110441.

The present membrane may be uncoated, or contain a coating layer, such as the one described in the international application PCT/IB2013/050794.

Membrane Cleaning Operations

In continuous processes using polymer filtration membranes, such as processes for ultrafiltration or microfiltration, periods of operation are commonly interrupted by 2 different types of cleaning operations: The first, more frequent one is a mere washing stage removing impurities on the feed water side commonly recalled as back flush or back washing step (BW). Generally after a longer term of operation, a step of chemical cleaning (often recalled as chemically enhanced backwash, CEB) is required in order to restore the membrane's permeability.

It is generally important that the membrane unit is equipped with an efficient cleaning system allowing periodical membrane regeneration, especially in dead end filtration systems using ultrafiltration (UF) or microfiltration (MF) membranes, e.g. for water and wastewater applications. As permeate is often used for cleaning operations, the productivity of the process sensitively depends on the frequency of these steps, which should be run under optimal conditions to ensure the optimal membrane regeneration and the highest possible permeate production per $m^2$ of membrane area. Generally, there are two types of cleaning operations:
Back washing using water (BW; the water may be permeate, fresh water or, in some cases, feed water)
Washing with diluted chemicals dissolved e.g. in permeate, known as chemical enhanced backwash (CEB)

In order to carry out both operations, various types of equipment can be applied.

Back Wash (BW):

Back wash, e.g. using permeate only, generally has to be repeated more frequently than CEB. A BW step is usually carried out
after pre-defined time intervals (typically, the back wash frequency can vary between 5 minutes and several hours, depending on the feed water quality); or
when the trans-membrane pressure (TMP) reaches its pre-defined value. This option allows a more flexible application of back wash, which may be adapted to feed water quality and thus prevent unnecessary losses of permeate.

The goals of back wash are mechanical removal of particles and deposit layers from the membrane surface and pores in order to increase the effective filtration area of the membrane. BW is widely used not only in water and wastewater UF and MF applications, but also in all kind of other applications in cross flow as well as in dead end systems. In a typical back wash operation,
a first rinsing (e.g. by opening the retentate path during the active feed flow) step is performed for a short period of time (e.g. 10 to 60 seconds);
the flow rate of permeate during the back wash is much higher as the filtration rate. For dead end filtration it should be higher as 200 $l/m^2*h$ (much higher flow rate is advantageous, but the mechanical membrane stability has to be considered);
the amount of back wash per $m^2$ is preferably at least 2 $l/m^2$ per BW. The optimum typically depends on the feed water/wastewater quality, and is a compromise between the optimal membrane regeneration and the highest possible permeate yield.

To complete the back wash, higher pressure in permeate than in the feed has to be established in order to induce a high flow rate in reverse direction. This is often realized using a pump, or gas pressure which is set on the permeate. Typically during BW, the feed inlet is closed and the retentate outlet is opened; a permeate buffer tank is advantageous.

Chemical Back Washing (Chemically Enhanced Backwash, CEB):

In many applications, mere back washing with permeate does not solve the problem of membrane fouling for an extended period of operation. As a consequence, the initial TMP increases after each BW, and an additional measure is necessary for full membrane regeneration. In these processes, maintenance steps with addition of chemicals are thus carried out in certain intervals after operation in order to remove suspended solids from the membrane surface, membrane pores or other parts of the filter module. In that case, chemical back washing or off line chemical washing is applied. Typically, these chemicals are acids, bases and/or oxidants. CEB can be done without stopping the filtration procedure, resulting in a duration time much shorter and a chemical demand much lower than in the case of off line chemical washing.

CEB is initiated, when membrane regeneration with BW is no longer effective and the TMP is too high. The goal of CEB is to remove the most of fouling components from the membrane surface and from the pores and to bring the TMP back to the initial value. CEB steps can be run after fixed intervals or advantageously when the TMP reaches a certain value. Depending on the feed quality, typical periods between CEB's may vary between 3 and 24 h or even longer.

Membrane fouling is a very complex process, which is not yet fully understood. Most of the deposits consist of material not belonging to one single chemical "class" but, depending on the feed water conditions such as temperature, time of the year or intensity of rainfall, showing strong variations of its composition. For example, such fouling deposit may contain major components of:

Mechanical particles such as sand, clay, Si-compounds etc.
Scaling products from Ca-, Mg-, Ba-sulfate or carbonate
Iron precipitations
Bacteria and bacteria films
Algae and its biofilms
Polysaccharides, humic acids and other organics
Metabolism products from bacteria, algae and other micro-organisms The main goal of CEB is to keep the growth of such fouling deposits on a minimal level, while keeping frequency and duration of CEB short enough to minimize use of chemicals and system down times. Most of the fouling deposits can be removed using acid, base and/or an oxidizing agent; typically diluted $H_2SO_4$, HCl, $HNO_3$, NaOH, NaOCl etc. The regeneration effect of the CEB depends not only on its frequency, the concentration of cleaning agents but also on the proper sequence of the used chemicals. Often used washing agents are:

Sulfuric acid, typically in a concentration of 0.015 N or higher, so that the pH of the cleaning liquid ranges between 0.5 and 2
Other inorganic acid solutions, typically of similar pH range
Base solution, mostly NaOH as the cheapest base, typically in a concentration of 0.03 N or higher, so that the pH of cleaning solution ranges between 10.5 and 12.5
Oxidizing agents such as NaOCl, typically in a concentration between 3 and 50 ppm in alkaline solution. Other oxidizing chemicals such as $H_2O_2$ can also be used.

In order to contact the membranes with the cleaning chemicals, a separate chemical back wash system is usually applied, especially to avoid permeate contamination and/or to allow separate cleaning of different membrane sections. It may contain:

Dosing equipment of concentrated chemicals to the back wash permeate, such as dosing pumps, flow meters, pressure transmitters
Mixing device like for instance Venturi injector, pump injector or static mixer
pH sensor in feed for pH control of cleaning solution
pH sensor in outlet to ensure the complete removal of chemicals from the system
Separate piping system for removal of one chemical before the second one is applied.

In case of CEB, flow through the membrane is not as essential as in case of BW. The main point is that the CEB solution completely fills the modules to ensure optimal conditions for CEB in the whole membrane area.

In a typical CEB cleaning step, once one of the cleaning chemicals is filled into the module, the dosing is stopped and the static washing is started. The optimal washing time depends on the origin and composition of the deposits and the chemicals used, and often varies from about 10 to 60 minutes. For example, a CEB sequence for optimal membrane regeneration may be as follows:

a) Rinsing of the modules using feed by opened retentate path (10-30 seconds);
b) NaOH washing, typically by filling NaOH solution into the module and steeping it for about 30-60 minutes;
c) ejection of NaOH solution, controlled, for instance, by a pH sensor;
d) NaOCl washing (or washing with any other oxidizing agent), e.g. by filling NaOCl solution into the module and steeping it for about 30-60 minutes (as an alternative, this step d may be combined with aforesaid step b);
e) ejection of NaOCl solution (or solution of the oxidizing agent), controlled, for instance, by a pH or redox sensor (alternatively to be combined with step c);
f) washing with acid, typically sulphuric acid, e.g. by filling $H_2SO_4$ solution into the module and steeping it for about 30-60 minutes;
g) ejection of acid solution, controlled, for instance, by a pH sensor;
h) restart of the permeate production procedure.

CEB is advantageously started, when the TMP increases above a certain value, or after a predefined operation time, for instance every 8 hrs.

A further application is a continuous use of oxidizing agents, for example as a continuous feed chlorination such as commonly used for swimming pools or in process control.

The following examples illustrate the invention. Unless otherwise stated, room temperature (r.t.) denotes an ambient temperature of 20-25° C.; overnight denotes a time period of approximately 15 hours; molecular weight data (such as Mw, Mn) are as determined by gel permeation chromatography; and water contact angle (WCA) measurements are performed according to the static sessile drop method.

Abbreviations used in the examples and elsewhere:
L litre
Mw molecular weight (mass average)
Mn molecular weight (number average)
NMP N-methylpyrrolidone
PD Polydispersity
PEG Polyethyleneglycol
PESU Polyethersulfone
PPSU Polyphenylsulfone
PP Polypropylene
PVP Polyvinylpyrrolidone
THF Tetrahydrofurane
w %, wt % percent by weight
micron micrometer
Components Used in the Examples:
A) Sulfone polymers
PESU is a polyethersulfone of the formula

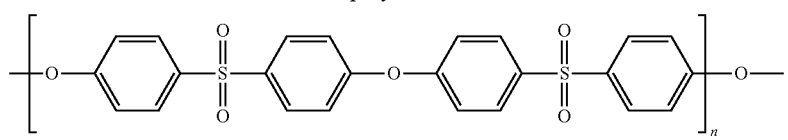

of Mw 55.9 kDa and Mn 16.3 kDa; end groups are H, halogen and/or methyl.

PPSU is a polyphenylsulfone of the formula

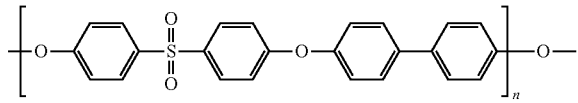

of Mw 54.4 kDa and Mn 18.7 kDa; end groups are H, halogen and/or methyl.

Polyethersulfone is available as a commercial product from the Ultrason® E-series from BASF SE, Germany. Polyphenylsulfone is available as a commercial product from the Radel® R-series from Solvay.

B) Further polymers and solvents:

THF and NMP are commercial products from Aldrich. Polyvinylpyrrolidone: Kollidon® K30 and Luvitec® PVP K90 are commercial products from BASF SE, Germany.

EXAMPLE 1: GENERAL PROCEDURE FOR PREPARATION OF PESU FLAT SHEET MEMBRANES (REFERENCE MEMBRANE A)

In a three neck flask equipped with a magnetic stirrer, a mixture of 80 ml of N-methylpyrolidone, 5 g of polyvinylpyrolidone (Luvitec® K90) and 15 g of PESU (Ultrason® E 3010P) are heated under gentle stirring at 60° C. until a homogeneous clear viscous solution is obtained. The solution is degassed overnight at room temperature. After that, the membrane solution is reheated at 60° C. for 2 hours and casted on a glass plate with a casting knife (300 microns) at 40° C. temperature. The membrane film is allowed to rest for 30 seconds before immersion in a water bath at 25° C. for 10 minutes.

After rinsing and removal of the superfluous PVP, a flat sheet continuous film with micro structural characteristics of UF membranes having dimension of at least 10×15 cm size is obtained. The membrane presents a top thin skin layer (1-3 microns) and a porous layer underneath (thickness: 230-250 microns).

EXAMPLE 2: GENERAL PROCEDURE FOR PREPARATION OF PPSU FLAT SHEET MEMBRANES (INVENTION, MEMBRANE D)

In a three neck flask equipped with a magnetic stirrer, a mixture of 80 ml of N-methylpyrolidone, 5 g of polyvinylpyrolidone (Luvitec® K90) and 15 g of PPSU (Radel® R5000) is heated under gentle stirring at 60° C. until a homogeneous clear viscous solution is obtained. The solution is degassed overnight at room temperature. After that, the membrane solution is reheated at 60° C. for 2 hours and casted on a glass plate with a casting knife (300 microns) at 40° C. temperature. The membrane film is allowed to rest for 30 seconds before immersion in a water bath at 25° C. for 10 minutes.

After rinsing and removal of the superfluous PVP, a flat sheet continuous film with micro structural characteristics of UF membranes having dimension of at least 10×15 cm size is obtained. The membrane presents a top thin skin layer (30-100 nm) and a porous layer underneath (thickness: 230-250 microns).

EXAMPLE 3: GENERAL PROCEDURE FOR PREPARATION OF PESU/PPSU BLEND FLAT SHEET MEMBRANES AT 90:10 RATIO (INVENTION, MEMBRANE B)

In a three neck flask equipped with a magnetic stirrer, a mixture of 80 ml of N-methylpyrolidone, 5 g of polyvinylpyrolidone (Luvitec® K90) and 13.5 g of PESU (Ultrason® E 3010P) and 1.5 g of PPSU (Radel® R5000) is heated under gentle stirring at 60° C. until a homogeneous clear viscous solution is obtained. The solution is degassed overnight at room temperature. After that the membrane solution is reheated at 60° C. for 2 hours and casted on a glass plate with a casting knife (300 microns) at 40° C. temperature. The membrane film is allowed to rest for 30 seconds before immersion in a water bath at 25° C. for 10 minutes.

After rinsing and removal of the superfluous PVP a flat sheet continuous film with micro structural characteristics of UF membranes having dimension of at least 10×15 cm size is obtained. The membrane presents a top thin skin layer (30-100 nm) and a porous layer underneath (thickness: 230-250 microns).

EXAMPLE 4: GENERAL PROCEDURE FOR PREPARATION OF PESU/PPSU BLEND FLAT SHEET MEMBRANES AT 80:20 RATIO (INVENTION, MEMBRANE C)

In a three neck flask equipped with a magnetic stirrer, a mixture of 80 ml of N-methylpyrolidone, 5 g of polyvinylpyrolidone (Luvitec® K90) and 12 g of PESU (Ultrason® E 3010P) and 3 g of PPSU (Radel® R5000) is heated under gentle stirring at 60° C. until a homogeneous clear viscous solution is obtained. The solution is degassed overnight at room temperature. After that, the membrane solution is reheated at 60° C. for 2 hours and casted on a glass plate with a casting knife (300 microns) at 40° C. temperature. The membrane film is allowed to rest for 30 seconds before immersion in a water bath at 25° C. for 10 minutes.

After rinsing and removal of the superfluous PVP a flat sheet continuous film with micro structural characteristics of UF membranes having dimension of at least 10×15 cm size is obtained. The membrane presents a top thin skin layer (30-100 nm) and a porous layer underneath (thickness: 230-250 microns).

EXAMPLE 5: GENERAL PROCEDURE FOR PREPARATION OF PESU CYLINDRICAL SINGLE CHANNEL MICROFILTRATION MEMBRANES (REFERENCE, MEMBRANE E)

A polymer solution of 20% PESU (Ultrason® E 3010P), 7% polyvinylpyrrolidone (Luvitec® K90), 10% of glycerol and 63% N-methylpyrolidone is extruded through an extrusion nozzle having a diameter of 1.0 mm and a needle of 0.5 mm. A solution of 25% NMP in 75% water is injected through the needles, as a result of which channels are formed in the polymer solution. The diameter of the channels is 0.8 mm, the outer diameter is 1.3 mm. The extrusion speed is 15 m/min, the coagulation bath has a temperature of 80° C. and the length of the path through water vapour is 30 cm. After rinsing and removal of the superfluous PVP a membrane is obtained having a permeability higher than 400 l/(m h bar) (in relation to the channels).

EXAMPLE 6: GENERAL PROCEDURE FOR PREPARATION OF PPSU CYLINDRICAL SINGLE CHANNEL MICROFILTRATION MEMBRANES (INVENTION, MEMBRANE F)

A polymer solution of 23% PPSU (Radel® R5000), 8% polyvinylpyrrolidone (Luvitec® K90) and 69% N-methylpyrrolidone is extruded through an extrusion nozzle having a diameter of 1.0 mm and a needle of 0.5 mm. A solution of 25% NMP in 75% water is injected through the needles as a result of which channels are formed in the polymer solution. The diameter of the channels is 0.8 mm, the outer diameter is 1.3 mm. The extrusion speed is 15 m/min, the coagulation bath has a temperature of 80° C. and the length of the path through water vapor is 30 cm. After rinsing and removal of the superfluous PVP a membrane is obtained having a permeability higher than 200 l/(m h bar) (in relation to the channels).

EXAMPLE 7: GENERAL PROCEDURE FOR PREPARATION OF PESU CYLINDRICAL MULTIPLE CHANNEL ULTRAFILTRATION MEMBRANES (REFERENCE, MEMBRANE G)

A polymer solution of 20% PESU (Ultrason® E 3010P), 9% polyvinylpyrrolidone (Luvitec® K90), 10% of glycerol and 61% N-methylpyrrolidone is extruded through an extrusion nozzle having a diameter of 4.0 mm and 7 needles of 0.8 mm. A solution of 40% NMP in 60% water is injected through the needles as a result of which channels are formed in the polymer solution. The diameter of the channels is 0.9 mm, the total diameter is 4.0 mm. The extrusion speed is 7 m/min, the coagulation bath has a temperature of 80° C. and the length of the path through water vapor is 20 cm. After rinsing and removal of the superfluous PVP a membrane is obtained having a permeability higher than 400 l/(m h bar) (in relation to the channels).

EXAMPLE 8: GENERAL PROCEDURE FOR PREPARATION OF PPSU CYLINDRICAL MULTIPLE CHANNEL ULTRAFILTRATION MEMBRANES (INVENTION, MEMBRANE H)

A polymer solution of 23% PPSU (Radel® R5000), 11% polyvinylpyrrolidone (Luvitec® K90) and 66% N-methylpyrrolidone is extruded through an extrusion nozzle having a diameter of 4.0 mm and 7 needles of 0.9 mm. A solution of 40% NMP in 60% water is injected through the needles as a result of which channels are formed in the polymer solution. The diameter of the channels is 0.9 mm, the total diameter is 4.0 mm. The extrusion speed is 7 m/min, the coagulation bath has a temperature of 80° C. and the length of the path through water vapor is 20 cm. After rinsing and removal of the superfluous PVP a membrane is obtained having a permeability higher than 200 l/(m h bar) (in relation to the channels).

EXAMPLE 9: MECHANICAL PROPERTIES AND GPC EVALUATION OF FLAT SHEET MEMBRANES AFTER EXPOSURE TO CONCENTRATE NAOCL SOLUTION AT PH=6

Flat sheet membranes of examples 1 to 4 are tested for NaOCl chemical stability. Flat sheets, 10×12 cm long, preliminary washed in 500 mL of water for 30', are placed wet in 500 mL closed flask with 1000 ppm (total free chlorine) NaOCl solution at room temperature. HCl 0.1 N is used to adjust pH=6 and pH=8.

NaOCl solution is replaced every 24 h and the test is run for 3 days. After this time, membranes are removed from NaOCl solution and washed several times with 0.5% NaHSO$_3$(aq) and water. Then, membranes are conditioned at 50% humidity at r.t for 48 h before evaluating their mechanical properties and molecular weight variation. Dumbbell-shaped probes 7.5 cm long and 1.3/0.5 cm wide are cut out and used to evaluate membrane mechanical properties.

Reduction of mechanical properties and molecular weight (Mw and Mn) due to NaOCl exposure is related to membrane polymer degradation. Results are reported in Table 1 & Table 2.

TABLE 1

Reduction of mechanical properties for flat sheet membranes exposed for 4 days at NaOCl (1000 ppm, pH = 6) due to chemical degradation. Data as average of 5 sample measurements. Test method: ISO527-1; Probe Type: Typ 5A. Force probe: 100N; Speed: 50 mm/min.

| | | Elongation@break (%) | |
|---|---|---|---|
| Flat sheet Membrane | PESU/PPSU ratio | Start | After 4 days |
| A (Reference) | 100/0 | 20.0 ± 1.4 | 5.5 ± 1.1 (−73%) |
| B | 90/10 | 21.6 ± 2.4 | 6.9 ± 1.2 (−68%) |
| C | 80/20 | 18.5 ± 1.8 | 7.1 ± 1.1 (−62%) |
| D | 0/100 | 18.5 ± 1.7 | 10.4 ± 1.6 (−44%) |

TABLE 2

Reduction of molecular weight for flat sheet membranes exposed for 4 days in 1000 ppm NaOCl (total free chlorine) at pH = 6 due to chemical degradation. Gel permeation chromatography (GPC) done in Dimethylacetamide + 0.5% LiBr. Calibration: polymethylmethacrylate

| | | Mw (Da) | | Mn (Da) | |
|---|---|---|---|---|---|
| Flat Sheet Membrane | PESU/PPSU ratio | Start | After 4 days | Start | After 4 days |
| A (Reference) | 100/0 | 54730 | 43630 (−20%) | 21280 | 12460 (−41%) |
| B | 90/10 | 53760 | 47430 (−12%) | 18170 | 15050 (−17%) |
| C | 80/20 | 54670 | 48560 (−11%) | 20510 | 17250 (−16%) |
| D | 0/100 | 57910 | 52230 (−10%) | 20420 | 17100 (−16%) |

Table 1 and Table 2 clearly indicate that for flat sheet membranes resistance to high chlorine concentration exposure at pH=6 (acid condition) is extended for membranes produced with polyphenylsulfone, alone or in blend with polyethersulfone. This higher tolerance for chlorine is translated in a lower reduction of elongation properties as well as membrane molecular weight if compared with 100% polyethersulfone (PESU) reference membrane.

EXAMPLE 10: MECHANICAL PROPERTIES AND MOLECULAR WEIGHT EVALUATION OF FLAT SHEET MEMBRANES AFTER EXPOSURE TO CONCENTRATE NAOCL SOLUTION AT PH=8 (TEST PERFORMED AS IN EXAMPLE 9, BUT AT PH=8; HCL 0.1 N IS USED TO ADJUST PH VALUE

Reduction of mechanical properties and molecular weight (Mw and Mn) due to NaOCl exposure is related to membrane polymer degradation. Results are reported in Table 3 & Table 4.

TABLE 3

Reduction of mechanical properties for flat sheet membranes exposed for 4 days at NaOCl (1000 ppm, pH = 8) due to chemical degradation. Data as average of 5 sample measurements. Test method: ISO527-1; Probe Type: Typ 5A. Force probe: 100N; Speed: 50 mm/min.

| Flat sheet Membrane | PESU/PPSU Ratio | Elongation@break (%) | |
|---|---|---|---|
| | | Start | After 4 days |
| A (Reference) | 100/0 | 19.9 ± 1.4 | 5.1 ± 1.2 (−74%) |
| B | 90/10 | 19.6 ± 2.4 | 7.8 ± 1.8 (−60%) |
| C | 80/20 | 18.5 ± 1.8 | 7.3 ± 1.3 (−61%) |
| D | 0/100 | 18.5 ± 1.7 | 10.2 ± 1.8 (−45%) |

TABLE 4

Reduction of molecular weight for flat sheet membranes exposed for 4 days in 1000 ppm NaOCl (total free chlorine) at pH = 8 due to chemical degradation. Gel permeation chromatography (GPC) done in Dimethylacetamide + 0.5% LiBr. Calibration: polymethylmethacrylate

| Flat Sheet Membrane | PESU/PPSU ratio | Mw (Da) | | Mn (Da) | |
|---|---|---|---|---|---|
| | | Start | After 4 days | Start | After 4 days |
| A (Reference) | 100/0 | 54730 | 47360 (−13.5%) | 21280 | 14860 (−30%) |
| B | 90/10 | 53760 | 50290 (−6.5%) | 18170 | 15850 (−13%) |
| C | 80/20 | 54670 | 50580 (−8%) | 20510 | 18350 (−13%) |
| D | 0/100 | 57910 | 54200 (−6%) | 20420 | 18850 (−10%) |

Table 3 and Table 4 clearly indicate that, for flat sheet membranes, resistance to high chlorine concentration exposure at pH=8 (basic condition) is extended for membranes produced with polyphenylsulfone, alone or in blend with polyethersulfone. This higher tolerance for chlorine is translated in a lower reduction of mechanical properties as well as membrane molecular weight if compared with 100% polyethersulfone (PESU) reference membrane.

Of course the remarkable improvement of mechanical property after chlorine degradation achieved with membrane based on polyphenylsulfone both at pH=6 and pH=8 is reflected into initial slightly lower flexibility especially for membrane with an increased amount of polyphenylsulfone polymer (membranes C, D).

EXAMPLE 11: EVALUATION OF WATER FLUX, FLUX RECOVERY AND PVP RETENTION IN PESU/PPSU FLAT SHEET MEMBRANES

Water flux and cleanability (flux recovery) of flat sheet membranes of examples 1 to 4 are performed. Blank PESU membrane is considered as reference, and PVP 1% (Kollidon® K30 from BASF) is used to evaluate retention and flux recovery.

Two membranes for each composition are tested and the results are the average of the two measurements.

The experiment consists of five main steps: initial water flux, retention of PVP, water rinse, chemical cleaning and final water flux. This sequence is repeated for 2 times for each membrane.

In a typical run, a membrane strip of appropriate dimensions is cut out from the corresponding flat sheet and is mounted in the cross flow cell (PP backing is used for support). Membrane is pre-compacted until a constant water flux is obtained, then the pressure is reduced and the initial water flux is measured for about 1 hour (Table 5). PVP retention is obtained using a 1% solution of PVP at P=0.5 bar under cross flow condition at room temperature for about 1 hour.

Water flux is measured before and after PVP filtration at P=1.0 bar. It is also measured after 15 minutes of chemical cleaning (NaOH 0.2%) buffering the membrane cell. The overall cycle is repeated 2 times and the remaining flux for the different membranes is estimated.

TABLE 5

Water flux, flux recovery and PVP retention for flat sheet membranes based on different composition of PESU/PPSU. Membranes produced at 300 micrometer thickness.

| Flat sheet membrane | PESU/PPSU ratio | Initial water flux (Kg/m2*h*bar) | Final water flux (Kg/m2*h*bar) | Flux recovery (%) | PVP Retention (%) |
|---|---|---|---|---|---|
| A (Ref.) | 100/0 | 430 | 300 | 70% | 88% |
| B | 90/10 | 535 | 335 | 63% | 92% |
| C | 80/20 | 525 | 345 | 66% | 92% |
| D | 0/100 | 390 | 270 | 69% | 91% |

EXAMPLE 12: MECHANICAL PROPERTIES AND MOLECULAR WEIGHT EVALUATION OF CYLINDRICAL SINGLE CHANNEL MICROFILTRATION MEMBRANES AFTER EXPOSURE TO CONCENTRATE NAOCL SOLUTION AT PH=8

Cylindrical membranes of examples 5 and 6 are tested for NaOCl chemical stability. Membranes, 4 cm long and with a diameter of 2.25 mm, preliminary washed in 500 mL of water for 30', are placed wet in 500 mL closed flask with 2000 ppm (total free chlorine) NaOCl solution at room temperature. HCl 0.1 N is used to adjust pH=8.

NaOCl solution is replaced every 24 h and the test is run for 7 days. After this time, membranes are removed from NaOCl solution and washed several times with 0.5% NaHSO3(aq) and water. Then, membranes are conditioned at 50% humidity at r.t for 48 h before evaluating their mechanical properties and molecular weight (by GPC) variation.

Reduction of mechanical properties and molecular weight (Mw and Mn) due to NaOCl exposure is related to membrane polymer degradation. Results are reported in Table 6 & Table 7.

TABLE 6

Reduction of mechanical properties for cylindrical single channel membranes exposed for 7 days at NaOCl (2000 ppm, pH = 8) due to chemical degradation. Data as average of 6 sample measurements. Test method: ISO527-1; Probe Type: Typ 5A. Force probe: 100N; Speed: 50 mm/min.

| Cylindrical single channel Membrane | PESU/PPSU ratio | Elongation@break (%) | |
|---|---|---|---|
| | | Start | After 7 days |
| E (Reference) | 100/0 | 40.2 ± 4.4 | 9.7 ± 1.5 (−76%) |
| F | 0/100 | 44.6 ± 3.6 | 29.5 ± 1.2 (−34%) |

TABLE 7

Reduction of molecular weight for cylindrical single channel membranes exposed for 7 days in 2000 ppm NaOCl (total free chlorine) at pH = 8 due to chemical degradation. Gel permeation chromatography (GPC) done in Dimethylacetamide + 0.5% LiBr. Calibration: polymethylmethacrylate

| Cylindrical single channel Membrane | PESU/PPSU ratio | Mw (Da) Start | Mw (Da) After 7 days | Mn (Da) Start | Mn (Da) After 7 days |
|---|---|---|---|---|---|
| E (Reference) | 100/0 | 55.900 | 40.400 (−28%) | 16.300 | 11.200 (−31%) |
| F | 0/100 | 54.400 | 43.400 (−20%) | 18.700 | 13.800 (−26%) |

EXAMPLE 13: MECHANICAL PROPERTIES AND MOLECULAR WEIGHT EVALUATION OF CYLINDRICAL MULTIPLE CHANNEL ULTRAFILTRATION MEMBRANES AFTER EXPOSURE TO CONCENTRATE NAOCL SOLUTION AT PH=8

Cylindrical membranes of examples 7 and 8 are tested for NaOCl chemical stability. Membranes, 4 cm long and with a diameter of 3.75 mm, preliminary washed in 500 mL of water for 30', are placed wet in 500 mL closed flask with 2000 ppm (total free chlorine) NaOCl solution at room temperature. HCl 0.1 N is used to adjust pH=8.

NaOCl solution is replaced every 24 h and the test is run for 7 days. After this time, membranes are removed from NaOCl solution and washed several times with 0.5% NaHSO3(aq) and water. Then, membranes are conditioned at 50% humidity at r.t for 48 h before evaluating their mechanical properties and molecular weight (by GPC) variation.

Reduction of mechanical properties and molecular weight (Mw and Mn) due to NaOCl exposure is related to membrane polymer degradation. Results are reported in Table 8 & Table 9.

TABLE 8

Reduction of mechanical properties for cylindrical multiple channel membranes exposed for 7 days at NaOCl (2000 ppm, pH = 8) due to chemical degradation. Data as average of 6 sample measurements. Test method: ISO527-1; Probe Type: Typ 5A. Force probe: 100N; Speed: 50 mm/min.

| Cylindrical multiple channel Membrane | PESU/PPSU ratio | Elongation@break (%) Start | Elongation@break (%) After 7 days |
|---|---|---|---|
| G (Reference) | 100/0 | 37.0 ± 3.9 | 6.6 ± 1.3 (−82%) |
| H | 0/100 | 42.6 ± 4.9 | 13.4 ± 1.5 (−69%) |

TABLE 9

Reduction of molecular weight for cylindrical multiple channel membranes exposed for 7 days in 2000 ppm NaOCl (total free chlorine) at pH = 8 due to chemical degradation. Gel permeation chromatography (GPC) done in Dimethylacetamide + 0.5% LiBr. Calibration: polymethylmethacrylate

| Cylindrical multiple channel Membrane | PESU/PPSU ratio | Mw (Da) Start | Mw (Da) After 7 days | Mn (Da) Start | Mn (Da) After 7 days |
|---|---|---|---|---|---|
| G (Reference) | 100/0 | 55.800 | 43.700 (−22%) | 16.500 | 11.300 (−32%) |
| H | 0/100 | 54.100 | 45.600 (−16%) | 18.500 | 15.000 (−19%) |

Tables 6 to 9 clearly indicate that for cylindrical single or multiple channel membranes resistance to high chlorine concentration exposure at pH=8 (basic condition) is extended for membranes produced with polyphenylsulfone. This higher tolerance for chlorine is translated into a lower reduction of mechanical properties as well as membrane molecular weight if compared with 100% polyethersulfone (PESU) reference membrane.

EXAMPLE 14: ORGANIC CHLORINE AND MOLECULAR WEIGHT EVALUATION OF CYLINDRICAL MULTIPLE CHANNEL MEMBRANES AFTER EXPOSURE TO CONCENTRATE NAOCL SOLUTION AT PH=8 AND T=45° C.

Cylindrical membranes of examples 7 and 8 are analysed based on the amount of organic chlorine linked to membrane polymer and reduction of molecular weight due to extensive NaOCl exposure. Membranes, 12 cm long and with a diameter of 3.75 mm, preliminary washed in 500 mL of water for 30', are placed wet in 500 mL closed flask with 2000 ppm (total free chlorine) NaOCl solution at T=45° C. HCl 0.1 N is used to adjust pH=8.

NaOCl solution is replaced every 24 h and the test is run for 6 days. After this time, membranes are removed from NaOCl solution and washed several times with 0.5% NaHSO3(aq), water and then EtOH. Membranes are then dried in oven under reduce pressure at 40° C. overnight. Organic chlorine is evaluated by element analysis (ICP-MS) as difference between Total and Ionic chlorine.

TABLE 10

Reduction of molecular weight (Mw and Mn) for multiple channel membrane based on PESU exposed to 2000 ppm NaOCl (total free chlorine) at pH = 8 and T = 45° C. Organic chlorine bounded to membrane due to NaOCl exposure. Gel permeation chromatography (GPC) done in Dimethylacetamide + 0.5% LiBr. Calibration: polymethylmethacrylate

| | PESU cylindrical multiple channel membrane | | |
|---|---|---|---|
| Chlorine exposure (ppm/h) | Mw (Da) | Mn (Da) | Organic Chlorine (g/100 g) |
| 0 | 55.420 | 15.160 | 0.40 |
| 4.475 | 51.840 | 12.720 | 1.02 |
| 44.375 | 48.730 | 10.880 | 1.93 |
| 71.625 | 44.400 | 9.640 | 2.23 |
| 116.125 | 39.780 | 8.844 | 2.97 |
| 141.625 | 34.900 | 7.937 | 3.2 |
| 251.125 | 34.520 | 7.398 | 3.77 |

TABLE 11

Reduction of molecular weight (Mw and Mn) for multiple channel membrane based on PPSU exposed to 2000 ppm NaOCl (total free chlorine) at pH = 8 and T = 45° C. Organic chlorine bounded to membrane due to NaOCl exposure. Gel permeation chromatography (GPC) done in Dimethylacetamide + 0.5% LiBr. Calibration: polymethylmetacrylate.

| | PPSU cylindrical multiple channel membrane | | |
|---|---|---|---|
| Chlorine exposure (ppm/h) | Mw (Da) | Mn (Da) | Organic Chlorine (g/100 g) |
| 0 | 52.000 | 18.400 | 0.31 |
| 7000 | 50.100 | 18.300 | 0.42 |
| 35.000 | 47.600 | 17.000 | 0.53 |
| 72.000 | 45.300 | 15.100 | 0.83 |
| 100.000 | 44.100 | 14.400 | 0.93 |
| 150.000 | 42.500 | 13.400 | 1.01 |
| 260.000 | 40.900 | 12.900 | 1.07 |

Table 10 to 11 clearly show that for multiple channel membranes reduction of molecular weight, Mw and Mn, is lower for membrane based on polyphenylsulfone (PPSU) than for the one based on polyethersulfone (PESU). The lower reduction of molecular weight caused by the aggressive hypochlorite radical activity is also reflected in a lower chlorination of the polymer membrane based on polyphenylsulfone.

The invention claimed is:

1. A filtration process, comprising subjecting a membrane polymer material to a chemically enhanced backwash comprising an aqueous solution comprising an oxidizing agent, wherein the oxidizing agent is hypochlorite, wherein the chemically enhanced backwash is a plurality of chemically enhanced backwashes with a period between chemically enhanced backwashes being between 3 and 24 hours, and wherein the hypochlorite is present in the chemically enhanced backwashes at a concentration of 1000 ppm or higher;

wherein the membrane polymer material comprises a polyether (A), whose main chain comprises 95 to 100% by weight of repeating units of the formulae (1) and (2)

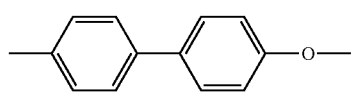
(1)

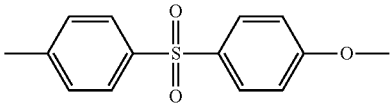
(2)

in alternating order, wherein the polyether (A) has a molecular weight Mw in a range of 10 to 500 kDa, wherein the membrane polymer material is an asymmetric polymer membrane obtained from a polymer solution in a coating process or in a phase inversion process, and the polyether (A) has been added to the polymer solution, wherein the asymmetric polymer membrane has a dense layer and a supporting layer, wherein a thickness of the supporting layer is from 30 to 2000 µm, and a thickness of the dense layer is not more than 0.5 µm, wherein the polyether (A) is present in the membrane polymer material in a total amount of not less than 85% by weight, and wherein the filtration process is a water filtration process.

2. The filtration process according to claim 1, wherein the polyether (A) containing repeating units of the formulae (1) and (2) has a formula (3)

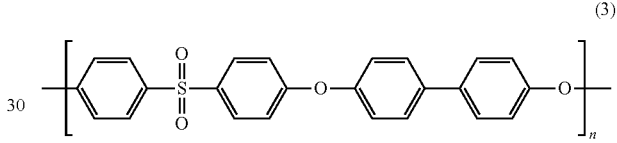
(3)

wherein n ranges from 30 to 1000.

3. The filtration process according to claim 1, wherein the membrane polymer material comprises the polyether (A) and a further polyether (B) comprising 95 to 100% by weight of repeating units of the formula (2), in an amount of 85 to 100% of the total weight of membrane polymers.

4. The filtration process according to claim 1, wherein the membrane polymer material is a water filtration membrane.

5. The filtration process of claim 1, wherein the membrane polymer material is in a form of a filtration module or plant.

6. The filtration process of claim 1, wherein the oxidizing agent is NaOCl.

7. The filtration process of claim 1, wherein the supporting layer has a pore size of from 1 to 100 µm.

8. The filtration process of claim 1, wherein the dense layer has a pore size of from 0.01 to 1.0 µm.

9. The filtration process of claim 1, wherein the chemically enhanced backwash is performed with a washing time of from 10 to 60 minutes.

* * * * *

UNITED STATES PATENT AND TRADEMARK OFFICE
CERTIFICATE OF CORRECTION

PATENT NO. : 10,569,227 B2
APPLICATION NO. : 15/029568
DATED : February 25, 2020
INVENTOR(S) : Edoardo Menozzi et al.

It is certified that error appears in the above-identified patent and that said Letters Patent is hereby corrected as shown below:

In the Specification

Column 2, Line 6, "pag." should read --p.--

Column 4, Line 15, "Polym" should read --Polym.--

Column 6, Line 21, "dimethylfolmamide" should read --dimethylformamide--

Column 8, Line 2, "polyerther" should read --polyether--

Column 8, Line 53, "di methylsulfoxide" should read --dimethylsulfoxide--

Column 11, Line 13, "micro-organisms" should read --microorganisms.--

Column 12, Line 55, "Tetrahydrofurane" should read --Tetrahydrofuran--

Column 13, Line 29, "methylpyrolidone" should read --methylpyrrolidone--

Column 13, Lines 29-30, "polyvinylpyrolidone" should read --polyvinylpyrrolidone--

Column 13, Line 52, "methylpyrolidone" should read --methylpyrrolidone--

Column 13, Lines 52-53, "polyvinylpyrolidone" should read --polyvinylpyrrolidone--

Column 14, Line 7, "methylpyrolidone" should read --methylpyrrolidone--

Column 14, Lines 7-8, "polyvinylpyrolidone" should read --polyvinylpyrrolidone--

Column 14, Line 28, "methylpyrolidone" should read --methylpyrrolidone--

Signed and Sealed this
Eleventh Day of August, 2020

Andrei Iancu
*Director of the United States Patent and Trademark Office*

CERTIFICATE OF CORRECTION (continued)
U.S. Pat. No. 10,569,227 B2

Column 14, Lines 28-29, "polyvinylpyrolidone" should read --polyvinylpyrrolidone--

Column 16, Line 59, "(TEST" should read --TEST--

Column 21, Line 7, "polymethylmetacrylate" should read --polymethylmethacrylate--